United States Patent
Ma et al.

(10) Patent No.: US 12,225,468 B2
(45) Date of Patent: Feb. 11, 2025

(54) POWER SAVING TECHNIQUES FOR LAYER-TO-LAYER INTERFACE

(71) Applicant: GREATER SHINE LIMITED, New Taipei (TW)

(72) Inventors: Tianan Tim Ma, San Diego, CA (US); Su-Lin Low, San Diego, CA (US); Hausting Hong, San Diego, CA (US); Chun-I Lee, San Diego, CA (US); Jianzhou Li, San Diego, CA (US); Hong Kui Yang, San Diego, CA (US); Xiaoshu Qian, San Diego, CA (US); Jian Gu, San Diego, CA (US); Chenxi Wang, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 192 days.

(21) Appl. No.: 18/064,231

(22) Filed: Dec. 9, 2022

(65) Prior Publication Data
US 2023/0105094 A1    Apr. 6, 2023

Related U.S. Application Data

(63) Continuation of application No. PCT/US2021/025729, filed on Apr. 5, 2021.
(Continued)

(51) Int. Cl.
*H04L 1/20* (2006.01)
*H04L 69/24* (2022.01)
*H04W 52/02* (2009.01)

(52) U.S. Cl.
CPC ......... *H04W 52/0238* (2013.01); *H04L 1/203* (2013.01); *H04L 69/24* (2013.01)

(58) Field of Classification Search
None
See application file for complete search history.

(56) References Cited

U.S. PATENT DOCUMENTS

| | | |
|---|---|---|
| 2008/0259957 A1 | 10/2008 | Kliger |
| 2009/0204827 A1 | 8/2009 | Diab |

(Continued)

FOREIGN PATENT DOCUMENTS

| | | |
|---|---|---|
| EP | 3627740 A1 | 3/2020 |
| KR | 102115794 B1 | 5/2020 |

OTHER PUBLICATIONS

You et al. "Network-coded multiple access II: Toward real-time operation with improved performance." IEEE Journal on Selected Areas in Communications 33.2 (2014): 264-280. Dec. 18, 2014 (Dec. 18, 2014).

(Continued)

*Primary Examiner* — Jenkey Van
(74) *Attorney, Agent, or Firm* — PERKINS COIE LLP

(57) ABSTRACT

A method includes: receiving, at a first layer of a protocol stack, multiple code blocks from a base station, the multiple code blocks is a portion of a transport block and is associated with an error rate; transmitting, to a second layer of the protocol stack, the multiple code blocks; and determining, at the second layer and based on the error rate, whether to (1) store the multiple code blocks in memory or (2) process the multiple code blocks. A method for saving power in a physical (PHY) layer-to-medium access (MAC) layer interface and a network device, and a system are also provided.

18 Claims, 6 Drawing Sheets

Related U.S. Application Data

(60) Provisional application No. 63/038,665, filed on Jun. 12, 2020.

(56) References Cited

U.S. PATENT DOCUMENTS

| | | | |
|---|---|---|---|
| 2014/0016538 A1* | 1/2014 | Thoumy | H04L 47/22 |
| | | | 370/315 |
| 2014/0053049 A1 | 2/2014 | Chen | |
| 2016/0285589 A1 | 9/2016 | Mukkavilli et al. | |
| 2019/0068507 A1* | 2/2019 | Livne | H04L 45/74 |
| 2020/0099480 A1* | 3/2020 | Grövlen | H04L 1/1822 |
| 2020/0119854 A1 | 4/2020 | Kim | |
| 2020/0195379 A1 | 6/2020 | Roh | |
| 2020/0220667 A1* | 7/2020 | Lundgren | H04L 1/0047 |
| 2020/0396739 A1* | 12/2020 | Sundararajan | H04L 1/1614 |

OTHER PUBLICATIONS

Saxena et al. "Efficient IoT gateway over 5G wireless: A new design with prototype and implementation results." IEEE Communications Magazine 55.2 (2017): 97-105. Feb. 3, 2017 (Feb. 3, 2017).
International Search Report in the international application No. PCT/US2021/025729, mailed on Jul. 20, 2021.
Written Opinion of the International Search Authority in the international application No. PCT/US2021/025729, mailed on Jul. 20, 2021.
Supplementary European Search Report in the European application No. 21821873.3, mailed on Nov. 7, 2023. 8 pages.

* cited by examiner

POWER SAVING TECHNIQUES FOR LAYER-TO-LAYER INTERFACE

CROSS-REFERENCE TO RELATED APPLICATION(S)

The application is a continuation of International Application No. PCT/US2021/025729 filed on Apr. 5, 2021, which claims priority to U.S. Provisional Application No. 63/038,665 filed on Jun. 12, 2020. The contents of both applications are incorporated herein by their entireties.

BACKGROUND

Wireless communications systems are being continually improved due to the ever-increasing demands placed on wireless communications systems. In 5th generation (5G) technology, for example, spectrum efficiency is improved when compared to previous generations. One technique that helps improve spectrum efficiency is code block group (CBG) based hybrid automatic repeat request (HARQ) retransmission. This technique includes the breaking up of transport blocks (TBs) into CBGs, which allows for processing of the CBGs by layers of the protocol stack.

In the downlink direction, in particular, the improved techniques of 5G can be utilized to increase the efficiency at a network device. For example, the network device may reduce power consumption due to the more granular approach of processing CBGs through the protocol stack. However, additional improvements will help further take advantage of the developments in 5G.

SUMMARY

The disclosed techniques relate to power saving techniques, and more particularly, to power saving techniques for a layer-to-layer-interface in a telecommunication device.

In a first aspect, the present disclosure provides a method including: receiving, at a first layer of a protocol stack, a plurality of code blocks from a base station, the plurality of code blocks is a portion of a transport block and is associated with an error rate; transmitting, to a second layer of the protocol stack, the plurality of code blocks; and determining, at the second layer and based on the error rate, whether to (1) store the plurality of code blocks in memory or (2) process the plurality of code blocks.

In a second aspect, the present disclosure provides a method for saving power in a physical (PHY) layer-to-medium access (MAC) layer interface, the method including: receiving, by the PHY layer, a portion of transport block from a base station; transmitting, by the PHY layer, the portion of the transport block to the MAC layer, and the portion of the transport block is associated with an error rate; and causing, by the PHY layer, the MAC layer to determine whether to (1) store the portion of the transport block in memory or (2) process the portion of the transport block.

In a third aspect, the present disclosure provides a system including: a processor; and a memory having instructions stored thereon that, when executed by the processor, cause the system to: receive a plurality of code blocks, the plurality of code blocks is a portion of a transport block, and wherein plurality of code blocks is associated with an error rate; and determine whether to (1) store the plurality of code blocks in the memory or (2) process the plurality of code blocks for transmission to an upper layer based on the error rate.

BRIEF DESCRIPTION OF THE DRAWINGS

The present embodiments are illustrated by way of example and are not intended to be limited by the figures in the accompanying drawings.

DETAILED DESCRIPTION

Figure 1:
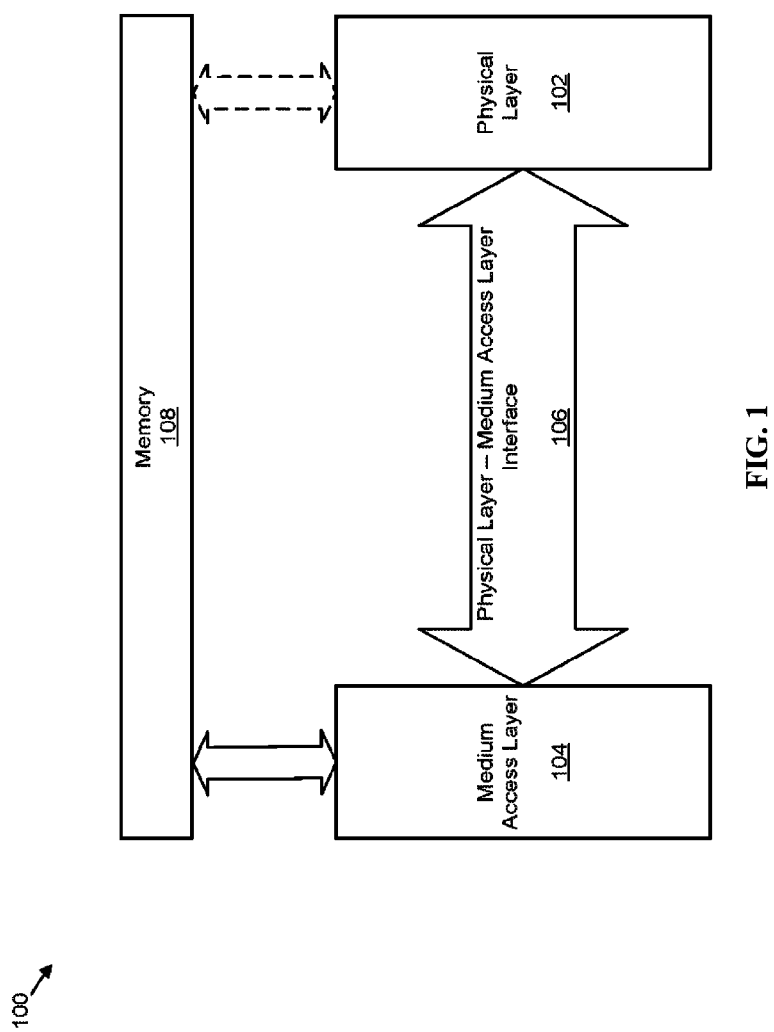
FIG. 1 illustrates a high level block diagram of the physical (PHY) layer and medium access (MAC) layer system with memory.

Wireless communication systems are constantly being improved to keep up with the increasing demands for efficiency. Efficiency, in a wireless communication device, is an encompassing term that can include factors such as the rate of power consumption, the usage of memory, the usage of space, and other factors. Given these multiple factors, there are also multiple ways that efficiency can be improved in a wireless communication system.

5th Generation (5G), for instance, allows for hybrid automatic repeat request (HARQ) retransmission. HARQ retransmission permits breaking up of transport blocks (TBs) into code block groups (CBGs), and the CBGs can be further broken down into multiple code blocks (CBs). As such, rather than transmitting, accepting, and/or processing an entire TB, a wireless communications system can handle one or more CBs or CBGs at a time.

For example, in the downlink direction, a terminal device (e.g., an iPhone) can be connected to a base station. The base station can transmit multiple CBs to the terminal device. The terminal device, upon receipt of the CBs, can store the CBs in external memory until all the CBs in the corresponding TB are received. In particular, at the protocol stack level, the physical (PHY) layer will store the CBs in external memory. Once all the CBs that make up the corresponding TB are received, the PHY layer will process the CBs and transmit them to the medium access (MAC) layer. At the MAC layer, a similar process takes place. The MAC layer will store CBs in memory until the MAC layer receives all the CBs in the corresponding TB from the PHY layer.

However, due to the granular approach developed for HARQ retransmission, the entire TB does not need to be retransmitted if one or more CBGs of the TB is, for example, lost during transmission. The one or more CBGs can be retransmitted to address the issue. For example, the PHY layer can indicate to the base station that a particular CBG was lost during transmission. The base station can then retransmit the particular CBG, rather than the entire corresponding TB. In this manner, HARQ retransmission increases the efficiency of a wireless communications system.

Yet, the HARQ retransmission technique is not used to its potential in the process described above. Namely, the retransmission and storage of CBs in memory, at each layer, causes at least two issues: power consumption and memory usage. In particular, power consumption is a key factor in the operation of a terminal device. Given that a terminal device is generally a standalone device, the onboard power must be used efficiently. In the method described, power is lost during the repetitive back-and-forth between a protocol layer and memory, and between the layers themselves. For instance, a PHY layer can repetitively transmit and receive CBs from memory, while also communicating with the base station. As such, the power is being consumed at an inefficient rate.

Further, the memory at a terminal device is limited. Thus, the memory should be efficiently used. In the current HARQ retransmission techniques, the memory is used to store the CBs until all the CBs of a corresponding TB are received. To do so, for example, the PHY layer will store received CBs in memory. Once all the CBs are received, the PHY layer will again remove the CBs from memory and transmit them to the MAC layer. At the MAC layer, the CBs are again stored in memory until the MAC layer receives all the CBs from the PHY layer. Thus, the memory is being utilized heavily for intermediate storage.

Other issues also arise with the use of the current HARQ retransmission techniques. For instance, there can be additional delays in the processing of CBs due to the wait time from receiving a CB to receiving all the CBs in the TB. This issue is compounded by the delay caused by communicating with the memory. Another issue is the stand-by time of layers of the protocol stack. For instance, if the MAC layer processes the previous set of CBs, the MAC layer still has to wait until the PHY layer receives all the CBs in the next transmission to begin processing the next transmission. Thus, there are several opportunities for improving the efficiency involved in implementing the HARQ retransmission techniques.

Introduced here, therefore, is at least one technique for improving the efficiency of CB transmission between the PHY layer and the MAC layer. In particular, the technique includes transmitting CBs from the PHY layer to the MAC layer irrespective of whether all the CBs of a corresponding TB are received or not. The CBs can be transmitted over a direct hardware interface or a standard bus. In the former option, the decoder at the PHY layer can be interconnected with a PHY-to-MAC interface. The PHY decoder can transmit the CBs through various interface signals. A MAC buffer can be connected to the other side of the PHY-to-MAC interface. In the latter option, the PHY layer can transmit the CBs to the MAC layer via a bus such as an Advanced Microcontroller Bus Architecture High Performance Bus (AHB). In this case, the data signals and the control data signals can be transmitted over the same bus or different busses.

In both options, the PHY layer does not need to store the CBs in the memory until it receives all the CBs of a corresponding TB from a base station. The PHY layer can, instead, transmit the CBs to the MAC layer as the CBs are received from the base station. The MAC layer, then, can determine whether to process the CBs or store them in memory. The MAC layer can make this determination based on, for example, the error rate associated with the CBs. If the error rate is above a threshold value, the MAC layer can store the CBs in memory and, for example, request transmission. If the error rate is below a threshold value, the MAC layer can continue to process the CBs. In this manner, the above mentioned issues are addressed.

In the following description, the examples of a terminal device (e.g., mobile device) are used, for illustrative purposes only, to explain various aspects of the techniques. For example, a cellular phone can apply a technique for transmitting CBs from the PHY layer to the MAC layer. Note, however, the techniques disclosed here are not limited to applicability to terminal devices, or to any other particular kind of devices. Other devices, for example, electronic devices or systems (e.g., wireless communication devices) may adapt the techniques in a similar manner.

Further, references are made to CBs and CBGs. A CBG is a grouping of multiple CBs. Thus, in some cases, the terms can be used interchangeably. For example, a PHY layer can transmit CBs to the MAC layer. The CBs can also be described as a CBG(s) because the CBs can be grouped as one or more CBGs. Also, references are made to layers of a protocol stack, such as the PHY and MAC layers, as performing actions. For example, as transmitting the CBs to the memory. However, note, that the hardware implementing layers are the components that perform these actions. The terms PHY and MAC layers are used merely for convenience of description.

Note, further, that while the techniques introduced here are described in the context of 5G technology, these techniques are not necessarily limited in applicability to 5G technology, nor even to wireless telecommunications. Hence, the techniques introduced here are potentially applicable in technology areas beyond those described herein.

PHY-to-MAC Interface Overview

FIG. 1 illustrates a high level block diagram 100 of the physical (PHY) layer and medium access (MAC) layer system with memory. Diagram 100 includes PHY layer 102, MAC layer 104, PHY layer-MAC layer interface 106, and memory 108. The PHY layer 102 is interconnected to the MAC layer 104 through the PHY layer-MAC layer interface 106. Further, the MAC layer 104 is connected to the memory 108. The PHY layer 102, conversely, is optionally connected to the memory 108.

The PHY layer 102 is optionally connected to the memory 108 because the PHY layer 102 does not need to communicate with memory 108. In particular, the PHY layer 102 does not need to store CBs in the memory 108 until all the Cbs of the corresponding TB are received. Instead, the PHY layer 102 can transmit the CBs to the MAC layer 104 as thee CBs are received from the base station. However, other wireless communications operations may require communication with memory 108. Thus, the connection with the memory 108 is optional in the context of the techniques described here.

In some embodiments, the PHY layer 102 can receive CBs from a base station (e.g., 5G NR) (not pictured). The CBs can be, for example, a portion of a CBG and/or a portion of a TB. For instance, PHY layer 102 can receive a given number of CBs from a base station. The given number of CBs can make up one CBG and a portion of a corresponding TB. In another example, the given number of CBs can make a portion of a CBG, which also makes up a portion of a corresponding TB. In yet another example, the number of CBs can make up multiple CBGs, which make up the entirety of a corresponding TB.

Regardless of the number of CBs, the PHY layer 102 can transmit the CBs to the MAC layer 104 through the PHY layer-MAC layer interface 106. Upon receipt, the MAC layer 104 can determine whether to process the received CBs or to store them in the memory 108. The determination can be based on, for example, the error rate. The error rate of a transmission is based on the CBs needing to be processes in an order. Generally, CBs should be received in an order. Thus, the MAC layer 104 can determine, based on the order in which the CBs are received, whether any CBs are missing and whether the CBs have been received in the correct order. If CBs are missing and/or the CBs are out of order, the MAC layer 104 can store the CBs in the memory 108. Once the error is resolved, the MAC layer 104 can retrieve the CBs from the memory 108 for further processing.

An error caused by missing CBs can be corrected in multiple ways. For instance, the PHY layer 102 can transmit, in a subsequent transmission, the missing CBs. In which case, the MAC layer 104 can retrieve the associated CBs from the memory 108 for further processing. For example, the MAC layer 104 can initially receive ten CBs. In the set of ten CBs, two CBs can be missing in the sequence. The MAC layer 104 can determine that there are two missing CBs because out of the ten received CBs, two intermediate CBs are missing in the order. In other words, the set should include twelve CBs, but only ten CBs were received. As such, the MAC layer 104 can determine to store the ten CBs in the memory 108. Subsequently, the PHY layer 102 can transmit the missing two CBs. Upon receipt, the MAC layer 104 can retrieve the ten CBs from the memory 108, and further process the twelve CBs.

Similarly, the MAC layer 104 can receive CBs out of order. The MAC layer 104 can determine whether a CB is out of order based on, for example, information in a header of the CB and/or control information received along with the CB. If the MAC layer 104 determines that the CBs are out of order, the CBs can be stored in the memory 108. While in the memory 108, the MAC layer can arrange the CBs in the correct order prior to further processing them (e.g., for transmission to an upper layer).

In some embodiments, the memory 108 can be any external memory device that is communicatively connected to the MAC layer 104. For instance, the memory 108 can be a double data rate (DDR) memory. In this context, external can mean that the memory is external to the MAC layer 104 hardware and within the terminal device in which the elements of the diagram 100 are implemented in. For instance, elements of diagram 100 can be implemented in a cellular phone (e.g., an iPhone). The memory 108 can be the memory servicing other components and functions of the device and thus, can be used for multiple purposes. However, the MAC layer 104 can be one of the multiple components of the device that can communicate with the memory 108.

In this manner and by using the components in diagram 100, the PHY layer 102 and MAC layer 104 can interact to optimize the HARQ retransmission technique. In addition, there are multiple ways to implement the PHY layer-MAC layer interface 106. One being a hardware-logic based interface design and the other being a programmable interface design based on a central processing unit (CPU) configuration.

Hardware Logic Based Interface

Figure 2A:
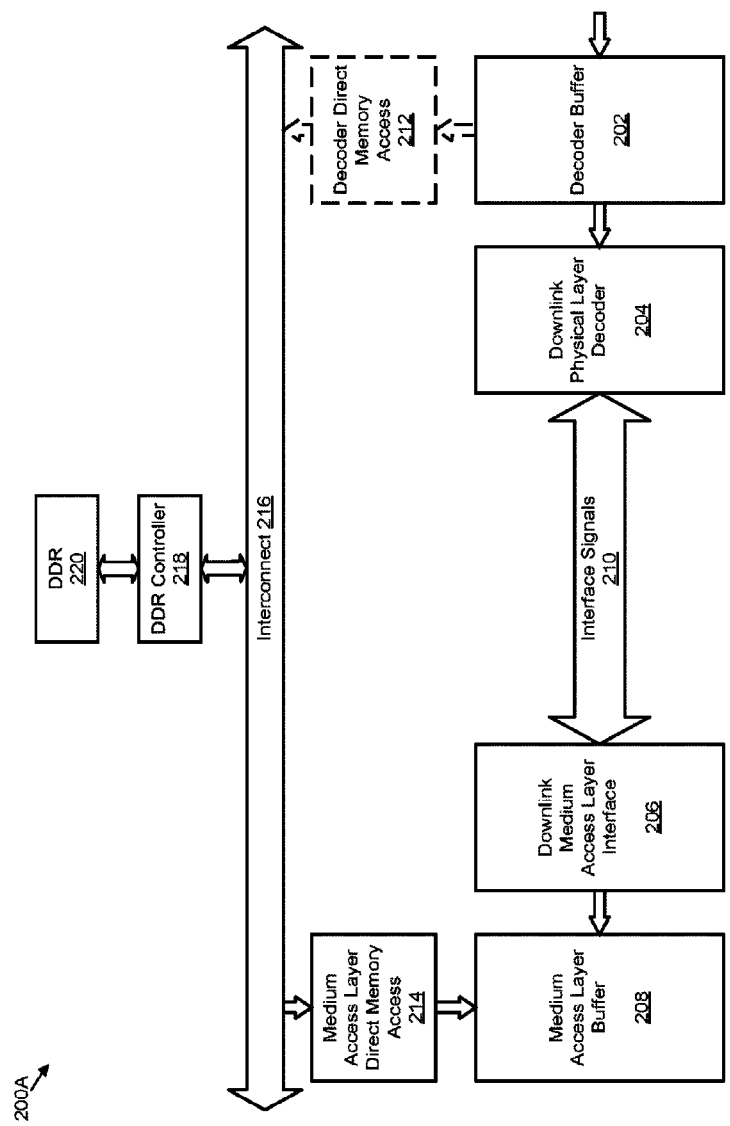
FIG. 2A illustrates a high level block diagram of a hardware-based implementation of the PHY layer-to-MAC layer interface.

FIG. 2A illustrates a high level block diagram of a hardware logic based implementation 200A of the PHY layer-to-MAC layer interface. Implementation 200A includes decoder buffer 202, downlink (DL) PHY layer decoder 204, DL MAC layer interface 206, MAC layer buffer 208, interface signals 210, decoder direct memory access (DMA) 212, MAC layer DMA 214, interconnect 216, DDR controller 218, and DDR 220. In some embodiments, the decoder buffer 202 and DL PHY layer decoder 204 can be a part of the PHY layer (e.g., PHY layer 102 in FIG. 1).

Further, the DL MAC layer interface 206 and MAC layer buffer 208 can be a part of the MAC layer (e.g., MAC layer 104 in FIG. 1).

The decoder buffer 202 can receive CBs from the base station (not pictured) and communicate with the DDR 220. As mentioned above, the connections and components between the decoder buffer 202 and the DDR 220 can be optional. In particular, in the context of the techniques described here, the decoder buffer 202 (of the PHY layer) does not need to communicate with the memory device, DDR 220. The decoder buffer 202 can also transmit CBs to the DL PHY layer decoder 204, which in turn, can transmit the CBs to the DL MAC layer interface 206.

In the hardware logic based design, the CBs can be transmitted through various interface signals 210. The interface signals 210 are described in more detail in conjunction with FIG. 2B. To begin communications, the DL PHY layer decoder 204 and the DL MAC layer interface 206 can establish a handshake signal. A handshake signal, generally, establishes and defines the protocols of a communication link between two participants in the communication. Once communications begins and the CBs are received by the MAC layer at the DL MAC layer interface 206 and transmitted to the MAC layer buffer 208, the MAC layer, as described above, can determine whether to process or store the CBs in the DDR 220. If, for example, due to an error rate that is above a threshold value, the CBs need to be stored in the DDR 220, the MAC layer buffer 208 can do so via the MAC layer DMA 214, interconnect 216, and DDR controller 218.

In some embodiments, the threshold value for the error rate can be dependent on the type of error. For example, if the error is missing CBs, the threshold error rate can be a ratio of missing CBs to received CBs. For instance, the ratio can be 1:5, which means one CB can be missing for every five received CBs. If the ratio is higher than 1:5, the received CBs can be stored in the DDR 220 until the error rate is resolved. Alternatively, if the error is caused by receiving CBs out of order, the CBs can, by default, be stored in the DDR 220 until the CBs are put into order.

Figure 2B:
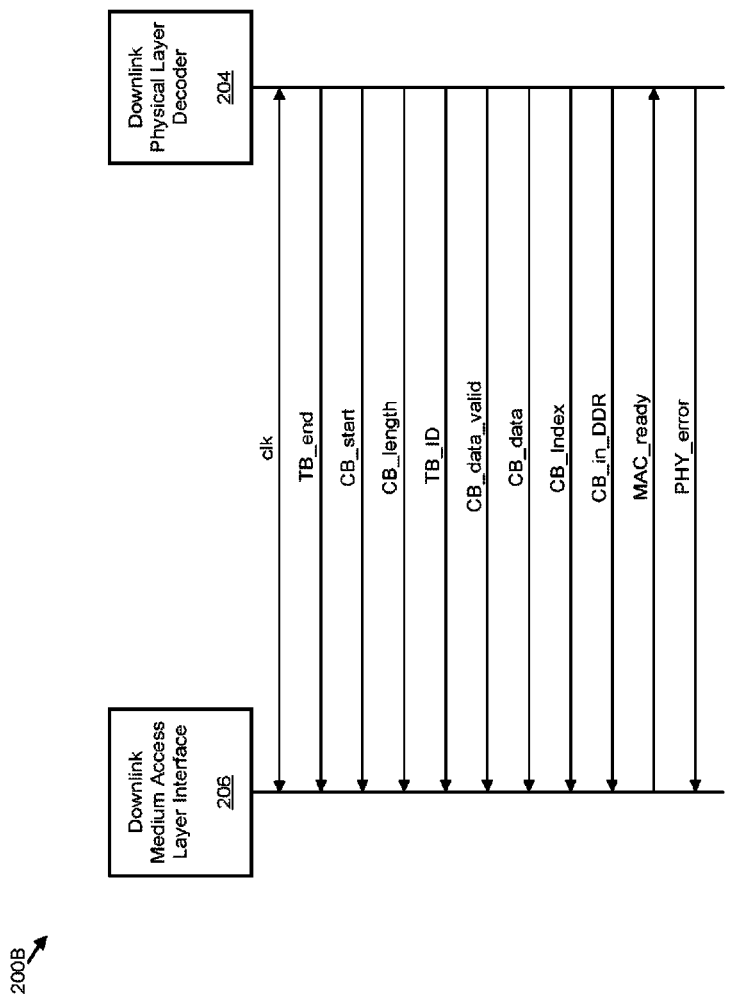
FIG. 2B illustrates the PHY layer to MAC layer interface signals.

FIG. 2B illustrates an example of the PHY layer to MAC layer interface signals 200B. FIG. 2B is best understood in view of the components in FIG. 2A. Namely, the signals 200B illustrated in FIG. 2B are transmitted between the DL PHY layer decoder 204 and DL MAC layer interface 206, described in FIG. 2A. The initial signal, clk, is the clock signal. Generally, a clock signal oscillates between high and low, in cycles, and is used to coordinate actions between the components. Next, TB_end is a single cycle pulse which indicates the end of the current TB data exchange. CB_start is a single cycle pulse that indicates that the first data cycle of a new CB specified by TB_ID and CB_index is going to be transmitted. CB_length indicates the length of each CB in bytes of the CB validated by the CB_start signal.

TB_ID or TB index identifies which TB the current data cycle belongs to. CB_data_valid indicates that a valid data cycle is occurring when the signal is high. CB_data is a CB data value associated with the CB identified by TB_ID and CB_index. The CB_data value is valid when the Cb_data_valid is high. MAC_ready indicates whether the MAC layer (e.g., MAC layer 104 in FIG. 1) is ready to receive data. CB_index is the index of the CB currently being transmitted. Moreover, the bit width of the CB_index signal indicates the number of CBs in the TB identified by the TB_ID signal.

CB_in_DDR provides the option for the DL PHY layer decoder 204 to indicate to the DL MAC layer interface 206 that the CB was already delivered to the intermediate memory (e.g., DDR 220 in FIG. 2A). If CB_in_DDR is high, the MAC layer will have to retrieve the CBs from the intermediate memory. However, as mentioned above, this signal will not be high unless other operations of the device cause the signal to be high. Lastly, PHY_error indicates that the PHY layer has an error condition.

For example, the DL PHY layer decoder 204 can initiate a data transfer by asserting CB_start. Simultaneously, the DL PHY layer decoder 204 can transmit identification information of the CB, which can include CB_index, Tb_ID, CB_length, and CB_data. Further, CB_data_valid signal can be asserted to indicate that the transfer is valid. Otherwise, the data will not be transferred. The DL PHY layer decoder 204 will then transfer the exact amount indicated by CB_length. After which, a new CB transfer can be initiated by asserting CB_start again. Once all the CBs in the TB are transferred, TB_end can be asserted.

Programmable Interface Design

Figure 3:
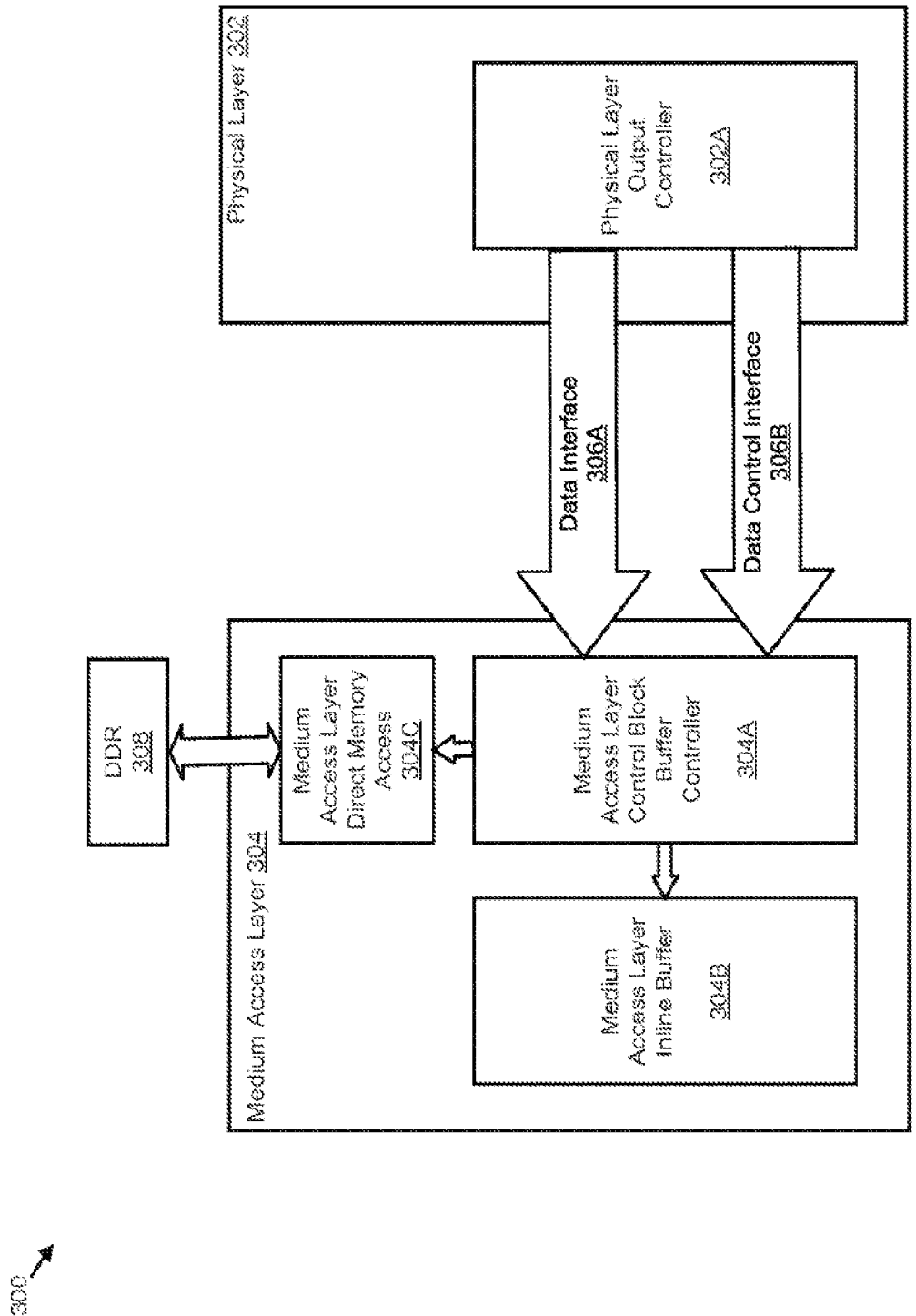
FIG. 3 illustrates a high level block diagram of a software-based implementation of the PHY layer-to-MAC Layer interface.

FIG. 3 illustrates a high level block diagram of a software-based implementation 300 of the PHY layer-to-MAC Layer interface. Implementation 300 includes components within the PHY layer 302 and MAC layer 304, interface(s) 306A-B, and DDR 308. The interface(s) 306A-B can be, for example, an AHB Lite, Open Core Protocol (OCP) lite, or any other type of bus. Control information (e.g., TB_ID, CB_index, CB_ID) can be transmitted through another bus, data control interface 306B. Alternatively, the data and the control information can be transmitted on one bus (e.g., data interface 306A).

Similar to the signals described in conjunction with FIG. 2B, the registers of the bus, interfaces 306A-B, can include data similar to that indicated by the interface signals described in FIG. 2B. For instance, a first register can include CB information such as CB_ID, TB_ID, CB_Index, and CB_length. A second register can include CB memory address and control register. This register, as described above, may not be utilized because the PHY layer need not store CBs in memory (e.g., DDR 308). A third register can indicate when the session is complete and can include TB_end.

Further, when the CBs are received out of order, due to transmission errors, the MAC layer 304 will have to order them prior to further processing. To do so, the MAC layer 304 may store the CB in the DDR 308 through the MAC layer DMA 304C. The process to order the out of order CBs can include coding the first and second registers, described above, once the CBs are received. After which, the MAC layer 304 can transmit the CBs to the DDR 308. Once the CBs are stored in the DDR 308, the third register can be coded. In this manner, the MAC layer 304 transfers the out of order CBs to the DDR 308.

Next, to put the CBs in order, the MAC layer 304 can use a circular buffer (not pictured). Each CB can be represented in the circular buffer at the location indicated by CB_index. The entry can also include a pointer to the memory location where the CB data is stored, an offset value from which the data starts in the memory (e.g., DDR 308), and a length which indicates the remaining length of data in the memory. In the memory, each CB can be associated with a header and a footer. The footer can contain a link information, which points to the next memory location such that a link between the memory locations is formed. Thus, the MAC layer 304 can check each memory location to sequence the CBs.

Example Methodology

Figure 4:
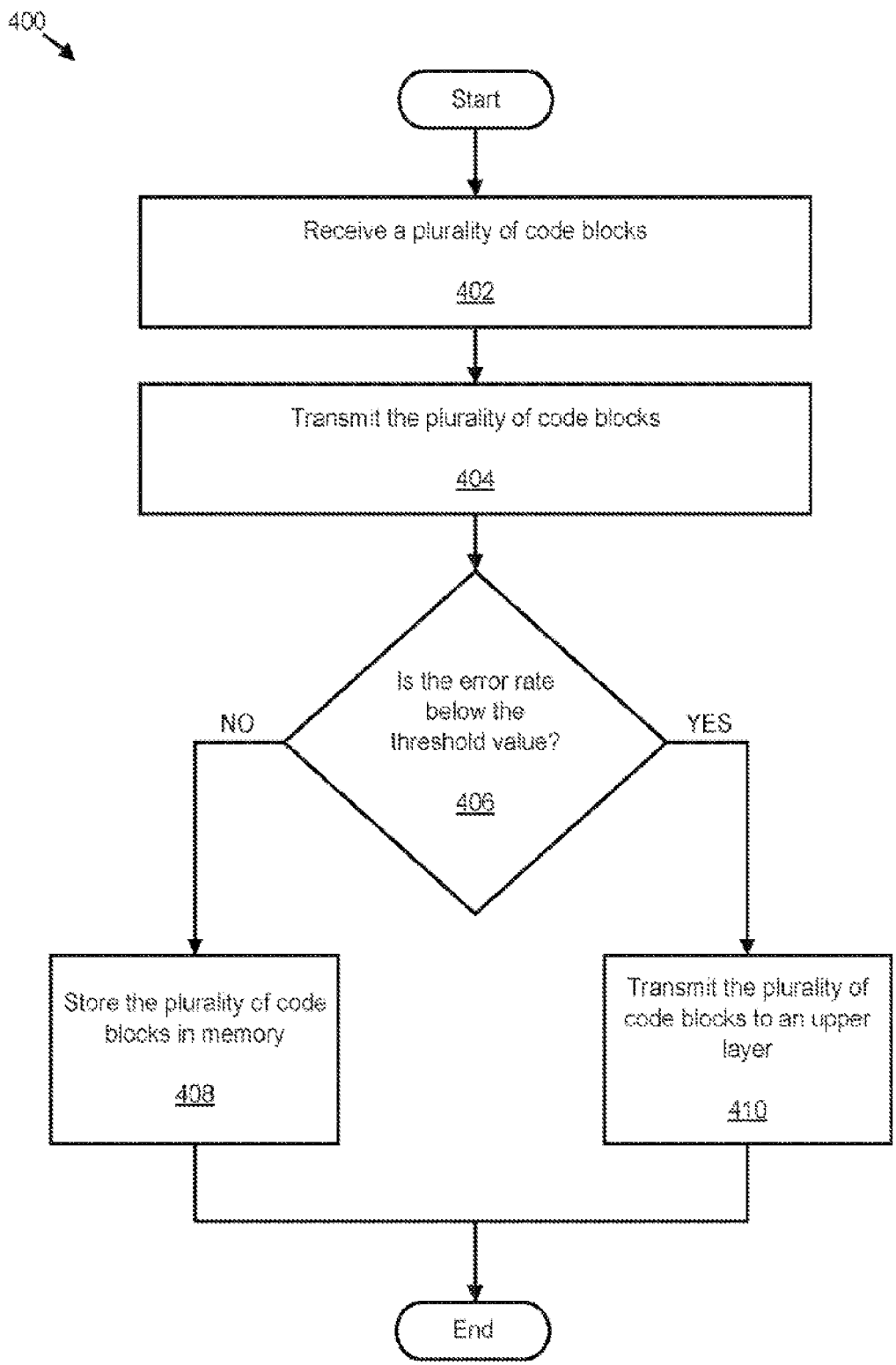
FIG. 4 is a flowchart illustrating a method for processing code blocks through the PHY layer-to-MAC layer interface.

FIG. 4 is a flowchart illustrating a method 400 for processing code blocks through the PHY layer-to-MAC layer interface. The method 400 can be implemented by any wireless communication device having a memory and a processor. For example, a terminal device such as a cellular phone (e.g., iPhone) can implement the method 400. Further, the terminal device can be operating on New Radio (NR) technology or Long Term Evolution (LTE) technology. The terminal device can include a receiver to receive CBs from a network node such as base station. The terminal device can also include a processor to perform at least some of the techniques described here in. Further, at least some of the techniques described herein can be applied upon receipt of CBs in the downlink plane of a telecommunications system.

At block 402, a layer of the protocol stack (e.g., PHY layer) can receive a plurality of CBs from, for example, a base station. The plurality of CBs can make up a portion of a TB and be associated with an error rate. At block 404, the plurality of CBs can be transmitted to a receiving layer (e.g., MAC layer). Block 404 can also include establishing a handshake signal between the two layers and receiving the CBs over a plurality of hardware interface signals. Alternatively, the plurality of CB can be received over a programmable interface such as a data interface bus. In some cases, there can be two interface busses: one bus for the control information and a second bus for the data.

At block 406, the receiving layer (e.g., the MAC layer), can determine whether the error rate is below a threshold value. The error rate can be indicative of the number of missing CBs within the TB. If the error rate is not below the threshold value, the receiving layer, upon receipt of the CBs, can determine that the error rate is higher than a threshold value. For instance, the ratio between the number of missing CBs to the number of received CBs can be higher than the threshold value. As such, at block 408, the MAC layer can store the plurality of CBs in memory. Alternatively, the MAC layer can determine that the error rate is below a threshold value. In this case, at block 410, the MAC layer can further process the CBs for, for example, transmission to an upper layer. The MAC layer can, for example, determine that the error rate is below a threshold value, once the missing CBs are received.

In some cases, the CBs can be received out of order. When this occurs, the receiving layer may order the CBs prior to further processing the CBs. To do so, the receiving layer can use a circular buffer. Further, the receiving layer can represent each CB in the circular buffer with an entry indicative of the identification information (e.g., CB_ID). In this manner, the layers of a protocol stack (e.g., PHY layer and MAC layer) can interact to process CBs irrespective of whether all the CBs of a corresponding TB have been received.

Example Computing System

Figure 5:
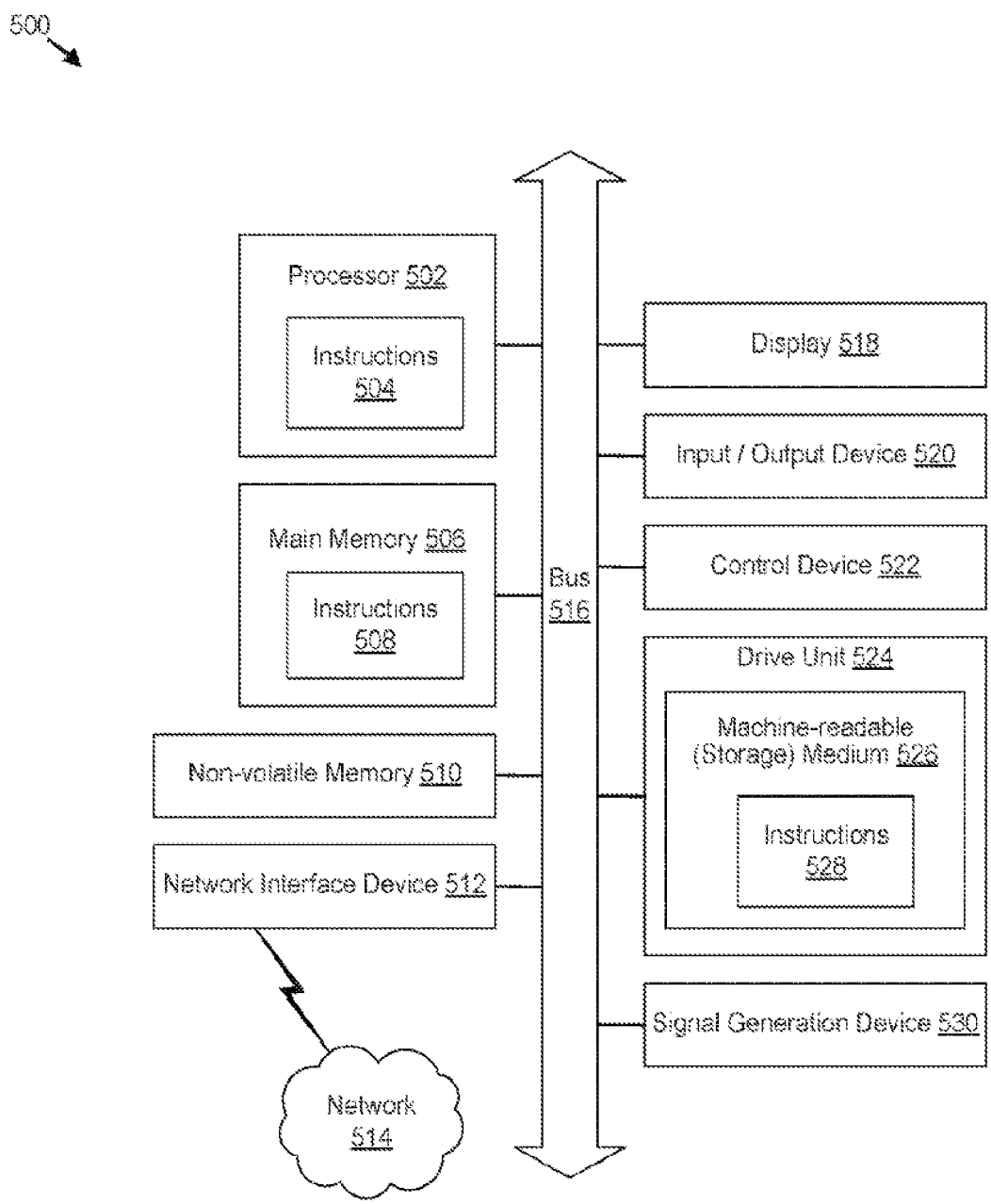
FIG. 5 is a block diagram illustrating a diagrammatic representation of a machine in the example form of a computer system operable to perform aspects of the disclosed technology.

FIG. 5 is a block diagram illustrating a diagrammatic representation of a machine in the example form of a computer system operable to perform aspects of the disclosed technology. For example, processing system 500 may be an example implementation of a network node or terminal device that may implement the techniques introduced above. At least a portion of the processing system 500 may be included in an electronic device (e.g., a computer server) that supports one or more CPNs and/or one or more UPNs. The processing system 500 may include one or more processors 502, main memory 506, non-volatile memory 510, network adapter 512 (e.g., network interfaces), display 518, input/output devices 520, control device 522 (e.g., keyboard and pointing devices), drive unit 524 including a storage medium 526, and signal generation device 530 that are communicatively connected to a bus 516. The bus 516 represents any one or more separate physical buses, point to point connections, or any combination thereof, connected by appropriate bridges, adapters, or controllers. The bus 516, therefore, can include, for example, a system bus, a Peripheral Component Interconnect (PCI) bus or PCI-Express bus, a HyperTransport or industry standard architecture (ISA) bus, a small computer system interface (SCSI) bus, any version of a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 500 operates as a standalone device, although the processing system 500 may be connected (e.g., wired or wirelessly) to other devices. For example, the processing system 500 may include a terminal that is coupled directly to a network appliance. As another example, the processing system 500 may be wirelessly coupled to the network appliance.

In various embodiments, the processing system 500 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system 500.

While the main memory 506, non-volatile memory 510, and storage medium 526 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 528. The term "machine-readable medium" and "storage medium" shall also be taken to include any medium that is capable of storing, encoding, or carrying a set of instructions for execution by the processing system 500 and that cause the processing system 500 to perform any one or more of the methodologies of the presently disclosed embodiments.

In general, the routines that are executed to implement the technology disclosed above may be implemented as part of an operating system or an application, component, program, object, module, or sequence of instructions (collectively referred to as "computer programs"). The computer programs typically comprise one or more instructions (e.g., instructions 504, 508, 528) set at various times in various memory and storage devices in a computer, and that, when read and executed by one or more processing units or processors 502, cause the processing system 500 to perform operations to execute elements involving the various aspects of the above disclosure.

Moreover, while embodiments have been described in the context of fully functioning computers, computer systems and/or other devices, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 510, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 512 enables the processing system 500 to mediate data in a network 514 with an entity that is external to the processing system 500, such as a network appliance, through any known and/or convenient communications protocol supported by the processing system 500 and the external entity. The network adapter 512 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 512 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination of such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Conclusion

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying claims.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "determining," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "a case" means that a particular feature, structure, or characteristic described in connection with the embodiment and/or case is included in at least one embodiment and/or case of the disclosure. The appearances of the phrase "in one embodiment" and/or "in this case" in various places in the specification are not necessarily all referring to the same embodiment and/or case, nor are separate or alternative embodiments and/or cases mutually exclusive of other embodiments and/or cases. Moreover, various features are described which may be exhibited by some embodiments and/or cases, and not by others. Similarly, various requirements are described which may be requirements for some embodiments and/or cases but not for other embodiments and/or cases.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of components and methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method comprising:
  receiving, at a first layer of a protocol stack, a plurality of code blocks from a base station, wherein the plurality of code blocks is a portion of a transport block and is associated with an error rate;
  transmitting, to a second layer of the protocol stack, the plurality of code blocks; and
  determining, at the second layer and based on the error rate, whether to (1) store the plurality of code blocks in memory or (2) process the plurality of code blocks,
  wherein the error rate is above a threshold value, the method further comprising:
    storing, at the second layer, the plurality of code blocks in memory.

2. The method of claim 1, wherein the plurality of code blocks is out of order, the method further comprising:
  storing, at the second layer, the plurality of code blocks in memory; and
  ordering, at the second layer, the plurality of code blocks.

3. The method of claim 1, wherein the plurality of code blocks is out of order, the method further comprising:
  representing, at the second layer, each code block of the plurality of code blocks with an entry in a circular buffer.

4. The method of claim 3, wherein the entry includes a pointer to where the code block is stored, an offset value, and a length.

5. The method of claim 1, wherein the error rate is indicative of a number of missing code blocks within the transport block.

6. The method of claim 1, wherein the error rate is indicative of a number of missing code blocks within the transport block, the method further comprising:
  receiving, at the second layer, the missing code blocks;
  in response to receiving the missing code blocks, determining, at the second layer, that the error rate is below the threshold value; and
  processing, at the second layer, the plurality of code blocks.

7. The method of claim 1, further comprising:
  determining, at the second layer, that the error rate is below a threshold value; and
  transmitting, at the second layer, the plurality of code blocks to an upper layer.

8. The method of claim 1, wherein transmitting the plurality of code blocks further comprises:
  establishing a handshake signal between the first layer and the second layer, wherein the handshake signal defines protocols for communication between the first layer and the second layer.

9. The method of claim 1, wherein the plurality of code blocks is transmitted over a plurality of hardware interface signals.

10. The method of claim 1, wherein the plurality of code blocks is transmitted through a data interface bus.

11. The method of claim 10, wherein the data interface bus is a first data interface bus, the method further comprising:
  receiving control information through a second data interface bus, wherein the second data interface bus is different from the first data interface bus.

12. The method of claim 1, wherein the first layer is a physical layer and the second layer is a medium access control layer.

13. The method of claim 1, wherein the memory is double data rate (DDR) memory.

14. A method for saving power in a physical (PHY) layer-to-medium access (MAC) layer interface, the method comprising:

receiving, at the PHY layer, a portion of transport block from a base station;

transmitting the portion of the transport block to the MAC layer, and wherein the portion of the transport block is associated with an error rate; and determining, at the MAC layer and based on the error rate, whether to (1) store the portion of the transport block in memory or (2) process the portion of the transport block, wherein the error rate is above a threshold value, the method further comprising:

storing, at the MAC layer, the portion of the transport block in memory.

15. The method of claim 14, wherein transmitting the portion of the transport block further comprises:

establishing a handshake signal between the PHY layer and the MAC layer, wherein the handshake signal defines protocols for communication between the PHY layer and the MAC layer; and transmitting the portion of the transport block over a plurality of hardware interface signals.

16. The method of claim 14, wherein transmitting the portion of the transport block further comprises:

transmitting the portion of the transport block through a data interface bus.

17. The method of claim 14, wherein the portion of the transport block includes a plurality of code blocks.

18. A system comprising:

a processor; and a memory having instructions stored thereon that, when executed by the processor, cause the system to:

receive, at a first layer of a protocol stack, a plurality of code blocks, wherein the plurality of code blocks is a portion of a transport block, and wherein plurality of code blocks is associated with an error rate;

transmit, to a second layer of the protocol stack, the plurality of code blocks; and determine, at the second layer and based on the error rate, whether to (1) store the plurality of code blocks in the memory or (2) process the plurality of code blocks for transmission to an upper layer based on the error rate, wherein the error rate is above a threshold value, the method further comprising:

storing, at the second layer, the plurality of code blocks in memory.

* * * * *